United States Patent [19]

Loy

[11] Patent Number: 4,679,912
[45] Date of Patent: Jul. 14, 1987

[54] BINOCULAR EYEPIECE

[75] Inventor: Fernand R. Loy, Sceaux, France

[73] Assignee: U.S. Philips Corporation, New York, N.Y.

[21] Appl. No.: 548,275

[22] Filed: Nov. 3, 1983

[30] Foreign Application Priority Data

Nov. 10, 1982 [FR] France ............................. 82 18920

[51] Int. Cl.$^4$ ............................................. G02B 25/04
[52] U.S. Cl. ................................. 350/410; 350/96.18
[58] Field of Search ................. 350/410, 96.15, 96.18, 350/96.27, 416

[56] References Cited

U.S. PATENT DOCUMENTS 3,166,623  1/1965  Waidelich .................... 350/96.18
3,658,412  4/1972  Seaman ........................... 350/410

Primary Examiner—John K. Corbin
Assistant Examiner—Rebecca D. Gass
Attorney, Agent, or Firm—David R. Treacy; F. Brice Faller

[57] ABSTRACT

A wide-field binocular eyepiece preferably for use with a flat image display system. The eyepiece includes a biconvex thick lens having concentric spherical lens surfaces whose radii are selected to satisfy the aplanatic condition. To minimize chromatic aberration, the biconvex thick lens may be formed of a plurality of cemented elements having indices which are close to each other but having respective different dispersions.

7 Claims, 6 Drawing Figures

BINOCULAR EYEPIECE

BACKGROUND OF THE INVENTION

This invention relates to a wide-field binocular eyepiece for use with display systems.

The use of monocular and binocular eyepieces in such systems, which employ either intensifier tubes or cathode-ray tubes, is known. Such eyepieces provide magnified virtual images of the pictures formed on the tube screens. Binocular eyepieces provide more convenient viewing than monocular eyepieces in systems comprising only one tube.

Calculating a wide-field binocular eyepiece is not simple and the quality of conventional systems with a total field of the order of 40 degrees is mediocre because of an imperfect correction for optical aberrations. French Patent Specification Nos. 2,167,945 and 2,172,415 to which British Patent Specification Nos. 1 389 564 and 1 404 793 correspond illustrate the complexity of such systems.

SUMMARY OF THE INVENTION

It is the object of the invention to achieve an excellent correction for said aberrations by means of a very small number of lenses over a very wide field which extends up to 80–90 degrees by utilizing the properties of aplanatic lens surfaces in combination with fibre-optic image guides.

As used herein, aplanatic lens surfaces will be understood to refer to those forming an aplanatic system, for which the "sine condition" holds. Such a system has no spherical aberrations on axis or for at least one off-axis point. This class of systems is described in Klein, *Optics*, John Wiley & Sons, N.Y., 1970, at p. 133 and 154. In accordance with the invention, said eye-piece comprises a biconvex thick lens made of a material having an index $n_1$ and comprising two concentric spherical lens surfaces, the second lens surface, which faces the object being viewed, having a radius equal to the quotient of the radius of the first lens surface and the index $n_1$. The optical axis of the system, is formed by the axis which extends through the common center of these lens surfaces perpendicularly to the object plane. A magnified virtual image of the plane object is formed on a spherical surface which is concentric with the lens surfaces and which has a radius equal to the product of the radius of the first lens surface and the index $n_1$. As a result the virtual image and the image formed on the second lens surface satisfy the aplanatic condition.

DESCRIPTION OF THE PREFERRED EMBODIMENTS

Figure 1:
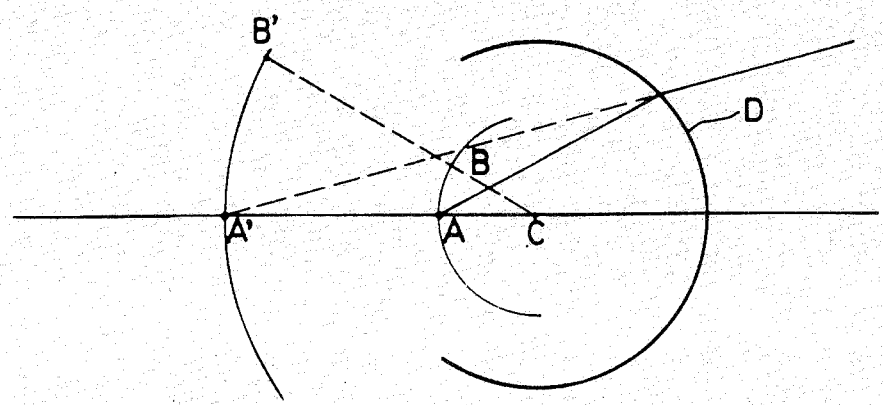
FIG. 1 is a schematic diagram which illustrates the properties of the spherical lens surface.

As is known, the spherical lens surface D having a center C and a radius R shown in FIG. 1 is aplanatic for the pair of points A and A'. For these points $CA = R/n$ and $CA' = nR$, n being the index of refraction of glass.

In a wider sense, if C is taken as the center of symmetry, all the points such as B and B' which are situated on the concentric systems having the radii CA and CA' respectively, are aplanatic.

This means that, with the aid of a single spherical lens surface, it is possible to form a magnetified virtual image A'B' of an object AB situated on a sphere, which vitual image itself is spherical and is corrected perfectly for any geometrical aberrations.

Figure 2:
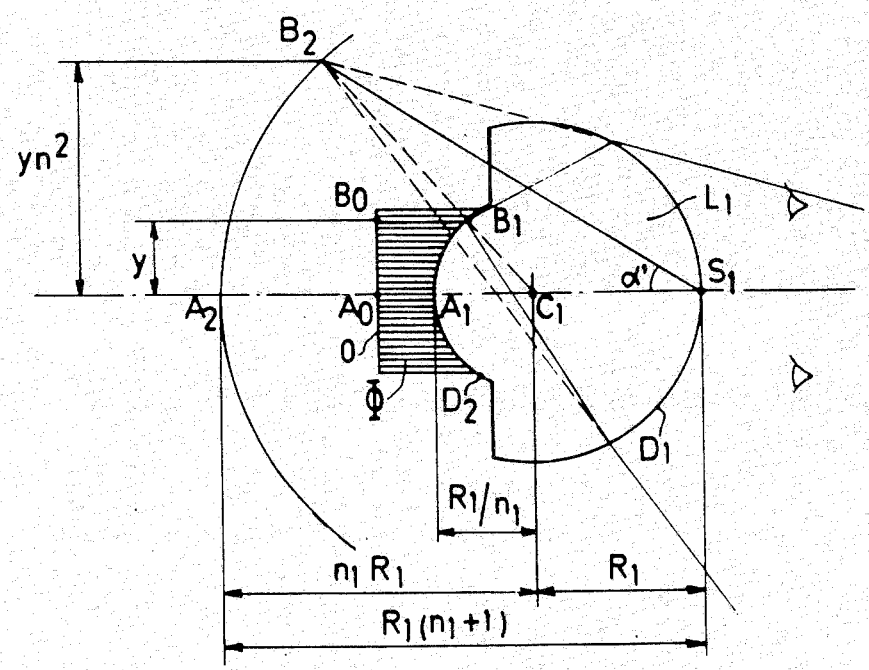
FIG. 2 is a diagram schematically showing a binocular eye piece in accordance with the invention.

FIG. 2 shows a binocular eyepiece in the accordance with the invention. It comprises a biconvex thick lens $L_1$ in combination with a fibre-optic image guide $\phi$.

The lens $L_1$, which is made of a material having an index $n_1$, comprises two concentric spherical lens surfaces $D_1$ and $D_2$ with a center $C_1$ and a radii $R_1$ and $R_1/n_1$ respectively, the lens surface $D_2$ facing the plane object being observed. This object is shown at O in the figure. The flat end of the fibre-optic image guide is cemented to the object surface and its spherical end is connected to the lens surface $D_2$. This results in the simplest form of a monocular or binocular eyepiece in accordance with the invention.

It is to be noted that the object being observed is not necessarily plane. It may have an arbitrary radius of curvature if the optical fibre image guide has the same radius.

Since point $A_0$ is the orthogonal projection of the center $C_1$ on the trace O representing the object observed, the system forms a magnified virtual image $A_2B_2$ of a straight line section $A_0B_0 = y$ of the trace which is transferred to $A_1B_1$ on the lens surface $D_2$ via the image guide $\phi$. The virtual image $A_2B_2$ is situated on a sphere having a center $C_1$ and a radius equal to $n_1R_1$.

The magnification of the lens system is equal to $n^2_1$ and the angle at which the image can be viewed from the apex $S_1$ of the lens (trace of the optical axis $A_0C_1$ on the lens surface $D_1$) is equal to:

$$\alpha' = \frac{y\, n_1^2}{R_1(n_1 + 1)}$$

if y is small.
The magnification of the lenses $$G = \frac{\alpha'}{\alpha},$$

$\alpha$ being defined as the angle at which the object is viewed by the naked eye when it is situated at the minimum distance at which it can be observed distinctly, for a said distance equal to $$250 \text{ mm}: \alpha = \frac{y}{250}.$$

Thus:

$$G = \frac{250\, n_1^2}{R_1(n_1 + 1)},$$

R being expressed in millimeters. It is to be noted that it is desirable to use a high index n.

This eyepiece can operate with a very high numerical aperture because the angle of incidence on the spherical lens surface may be such that a grazing incidence is obtained.

The Figure shows how both eyes of the viewer can see the image $B_2$ from the point $B_0$.

In this simple embodiment comprising only one lens and a fibre-optical array, this eyepiece is perfectly aplanatic. Its total field $2\alpha$ for an eye situated at the apex $S_1$ may range up to 180 degrees with a constant quality. However, it is not corrected for chromatic aberration. This eyepiece constitutes a perfect monochromatic instrument.

The eyepiece comprising a single lens $L_1$ has the disadvantage that it forms a virtual image at a comparatively short distance. This drawback can be overcome by arranging an additional optical system between the lens $L_1$ and the viewer in such a way that this system forms another virtual image of the virtual image $A_2B_2$, which now acts as a virtual object, at a more suitable viewing distance.

Figure 3:
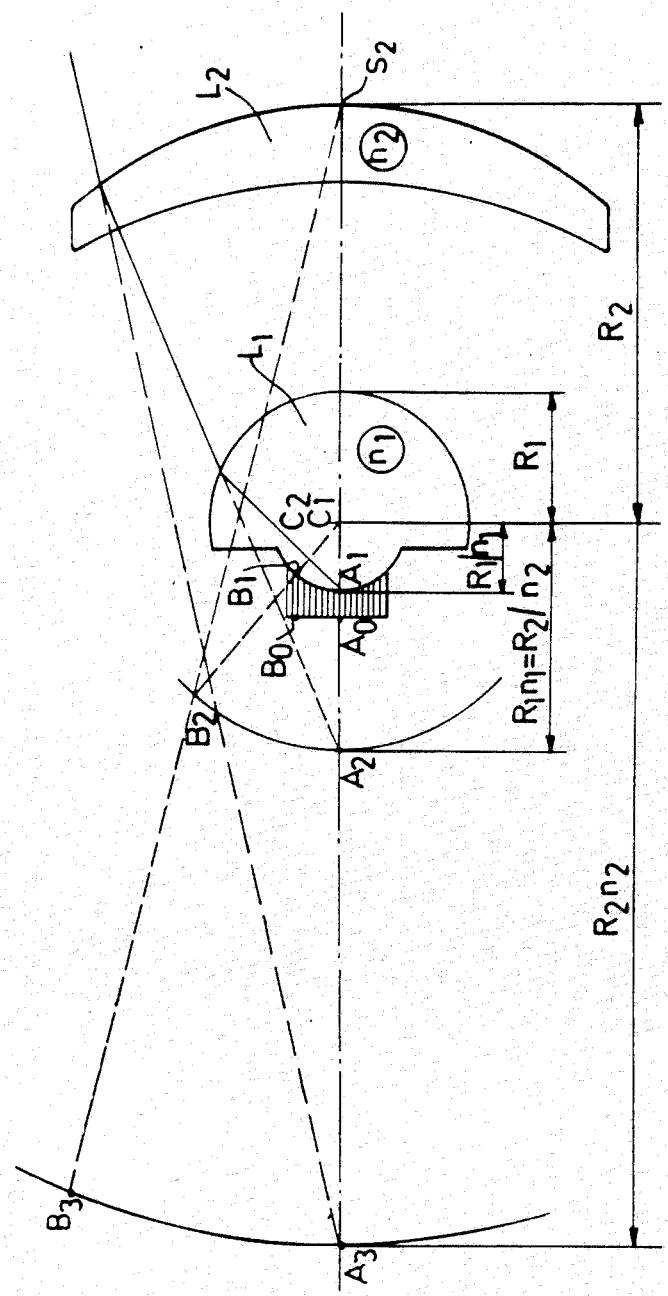
FIG. 3 is a diagram schematically showing the same binocular eyepiece with an additional optical system for obtaining a more remote image.

Suitably, this additional optical system shown in FIG. 3 may comprise a convergent aplanatic meniscus lens $L_2$ having index $n_2$ and forming the virtual image $A_3B_3$ of $A_2B_2$. The center of curvature of the concave surface of this meniscus lens is situated in $A_2$ and the convex surface is aplanatic for points $A_2$ and $A_3$. In order to maintain a center of symmetry said concave surface have a center $C_2$ which coincides with the center $C_1$ of the lens $L_1$. This requirement is met if its radius of curvature has the value: $R_2 = R_1 n_1 n_2$. The image of the point $A_3$ is then formed at such a distance from the apex $S_2$ of $L_2$ that:

$$S_2 A_3 = R_1 n_1 n_2 (n_2 + 1)$$

If this distance is inadequate, further meniscus lenses $L_3, L_4 \ldots L_p$ made of materials having indices $n_3, n_4, \ldots n_p$ may be added, which lenses function in a similar manner, the concave surface of a meniscus lens of arbitrary order i between 2 and p or equal to p being centered on the point of intersection of the optical axis with the virtual image formed by the meniscus lens of the order $i-1$ and the convex surface of this meniscus lens of the order i having a center which coincides with that of the lens $L_1$ and a radius of curvature $R_i = R_1 n_1 n_2 \ldots n_i$. This results in an aplanatic system which yields an excellent image quality over a very wide field, because the system has a center of symmetry in $C_1$. The quality is constant as a function of the angle of field. For most uses, two or three lenses are adequate.

This eyepiece is therefore an instrument which operates correctly for monochromatic light or in a narrow spectrum like that of certain image-tube phosphors.

If the spectral band is wide the system can be rendered achromatic. The thick lens $L_1$ must then be duplicated and use must be made of two types of glass having indices close to each other and having different dispersions. The achromatic eyepiece shown in FIG. 4a, therefore, comprises two cemented lenses: a convergent lens with a low dispersion $\nu'$ and a divergent lens with a high dispersion $\nu''$.

If the indices are equal, the eyepiece is perfectly aplanatic over the entire field. Only the chromatic aberration varies slightly as a function of the field because the optical system no longer has a center of symmetry.

If the indices are close to each other perfect aplanatism cannot be accomplished, but the departure from the aplanatic condition is very small and the correction is practically perfect.

Figure 4B:
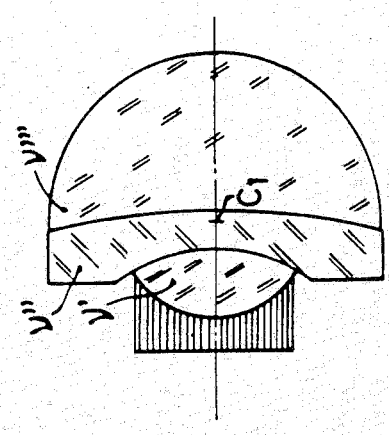
FIGS. 4a and 4b are elevations of two examples of an achromatic eyepiece.
Figure 4A:
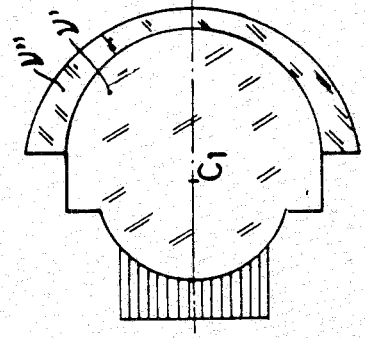

FIG. 4b shows an achromatic eyepiece comprising three lenses having indices which are close to each other, and having different dispersions. The lens $L_1$, for example, comprises a divergent lens with a high dispersion $\nu''$ cemented between two convergent lenses with low dispersion $\nu'$ and $\nu'''$.

In the binocular eyepiece comprising additional elements for the formation of an image at a greater distance, the lens $L_2$ can be rendered achromatic by duplicating it, using two cemented lenses made of types of glass having indices which lie close to each other and having different dispersions.

If the requirements $R_2 = R_1 n_1 n_2$ for the lens $L_2$ and $R_p = R_1 n_1 n_2 \ldots n_p$ for the lens $L_p$ are satisfied, the system comprising p lenses has the center of curvature of the lens surface $D_1$ as its center of symmetry. Now an aplanatic system is obtained whose quality is constant as a function of the angle of field.

If, for certain uses a slight degradation of the quality as a function of the angle of field is acceptable, which in general is acceptable for all optical systems, the above-listed requirements need not be satisfied entirely. The lens $L_2$ is always an aplanatic lens whose concave surface has a center of curvature which coincides with $A_2$ and whose convex surface is aplanatic for the points $A_2$ and $A_3$, but the air gap separating $L_1$ and $L_2$ may be reduced so as to minimize the dimensions of the eyepiece. The eyepiece thus obtained is always aplanatic for the field center. It is possible to add a third lens $L_3$ which operates in a similar manner.

Figure 5:
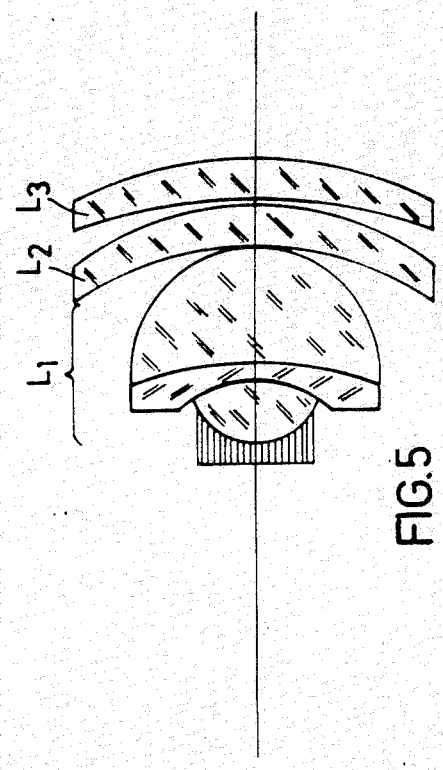
FIG. 5 is an elevation of an example of a compact eyepiece.

Such an eyepiece is shown in FIG. 5. By means of this eyepiece it is readily possible to obtain a total field of binocular vision of 60 degrees with an excellent correction for aberrations. Here, the lens $L_1$ is rendered achromatic: it comprises three cemented lens elements.

The optical fibre shown is a straight fibre but the eyepiece may alternatively be used in conjunction with inverting fibres, with magnifying or reducing or with bent fibres.

For periscopic systems, it may be advantageous to use a bend eyepiece.

Figure 6:
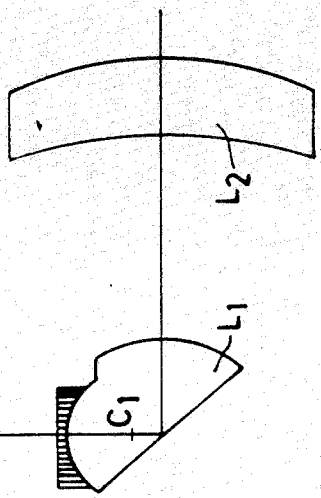
FIG. 6 schematically shows an example of an angular eyepiece for periscopic systems.

Suitably, this eyepiece may provide the required deflection inside $L_1$ as is shown in FIG. 6, because this lens is very thick. Bending is also possible between $L_1$ and $L_2$ or in $L_2$ if the latter is made very thick. This is because the thickness of $L_2$ may be varied without affecting the operation of the system; it is only necessary that its concave surface is centered in $A_2$.

This type of binocular eyepiece may of course be used as a monocular eyepiece. In this way it is possible to obtain eyepieces of a very large diameter with a perfect correction for aberrations.

The same optical formula may be applied to objectives with a large aperture and wide field as used in light-intensifier tubes. An optical fibre whose entrance face is curved on the objective side and flat on the tube side can be coupled to an intensifier tube having an optical-fibre input.

What is claimed is:

1. A wide-field eyepiece for viewing an object surface plane, comprising a biconvex thick lens made of a material having an index $n_1$, having first and second concentric spherical lens surfaces, each having a respective radius, a line through the common center of said lens surfaces, forming an optical axis of the system, said lens being arranged such that the second lens surface faces the object plane, and has a radius equal to the quotient of the radius of the first lens surface and the index $n_1$, and means for forming a magnified virtual image of the object on a spherical surface which is concentric with said lens surfaces and has a radius equal to the product of the radius of the first lens surface and the index $n_1$, said virtual image and the image formed on the second lens surface satisfying the aplanatic condition.

2. A wide-field eyepiece for viewing an object surface, comprising a biconvex thick lens comprising a plurality of cemented lens elements, each element having an index close to $n_1$, said elements having respective different dispersions to provide correction for chromatic aberration, having first and second concentric spherical lens surfaces, each having a respective radius, a line through the common center of said lens surfaces forming an optical axis of the system, said lens being arranged such that the second lens surface faces the object plane, and has a radius equal to the quotient of the radius of the first lens surface and the index $n_1$, and means for forming a magnified virtual image of the object on a spherical surface which is concentric with said lens surfaces and has a radius equal to the product of the radius of the first lens surface and the index $n_1$, said virtual image and the image formed on the second lens surface satisfying the aplanatic condition.

3. A eyepiece as claimed in claim 1 or 2, characterized by comprising an additional element of the order 2, said thick lens constituting an element of the order 1, said additional element being a convergent meniscus lens formed by p-2 addtional lens elements of the order 2, 3, . . . p, wherein p is a positive number greater than 2, each additional lens element being a convergence meniscus lens element made of a material having a respective index $n_2, n_3, \ldots n_p$; the concave surface of a respective menisucus lens element of the order i being a spherical lens surface having the center of curvature at the intersection of the optical axis with the virtual image formed by the element of the order i-1, wherein i has an arbitrary value greater than 1 and no greater than p; and the convex surface of each said additional lens element being a spherical surface concentric with the lens surfaces of said thick lens, and having a radius equal to the product of the radius of said first lens surface and the respective index $n_1, n_2, \ldots n_i$, the magnified virtual image formed by said meniscus lens of the order i lying on a spherical surface which is concentric with the respective convex surface and has a radius equal to the product of the radius of the respective convex surface and the index $n_i$, thereby satisfying the aplanatic condition.

4. An eyepiece as claimed in claim 3, forming a periscopic system, comprising means for providing deflection inside said thick lens.

5. An eyepiece as claimed in claim 3, characterized in that each additional lens element comprises two cemented lens elements having respective indices which are close to each other, and having different dispersions selected to correct chromatic aberration.

6. An eyepiece as claimed in claim 5, characterized in that said thick lens and said additional lens elements are arranged close to each other to form a compact eyepiece.

7. An eyepiece as claimed in claim 6, forming a periscopic system, comprising means for providing deflection inside said thick lens.

* * * * *

UNITED STATES PATENT AND TRADEMARK OFFICE
CERTIFICATE OF CORRECTION

PATENT NO.   : 4,679,912
DATED        : July 14, 1987
INVENTOR(S)  : Fernand R. Loy It is certified that error appears in the above-identified patent and that said Letters Patent is hereby corrected as shown below:

Claim 1, line 2    delete "plane"

Signed and Sealed this

Twenty-third Day of May, 1989

*Attest:*

DONALD J. QUIGG

*Attesting Officer*    *Commissioner of Patents and Trademarks*